US012764134B2

(12) United States Patent
Maurya et al.

(10) Patent No.: US 12,764,134 B2
(45) Date of Patent: Oct. 13, 2026

(54) METHOD AND SYSTEM FOR DETECTING INTRUSIONS IN INDUSTRIAL CONTROL SYSTEMS

(71) Applicant: INDIAN INSTITUTE OF TECHNOLOGY KANPUR, Kanpur (IN)

(72) Inventors: Vikas Maurya, Kanpur (IN); Sandeep Kumar Shukla, Kanpur (IN)

(73) Assignee: INDIAN INSTITUTE OF TECHNOLOGY KANPUR, Kanpur (IN)

( * ) Notice: Subject to any disclaimer, the term of this patent is extended or adjusted under 35 U.S.C. 154(b) by 25 days.

(21) Appl. No.: 19/076,611

(22) Filed: Mar. 11, 2025

(65) Prior Publication Data

US 2026/0052161 A1 Feb. 19, 2026

(51) Int. Cl.

*H04L 47/20* (2022.01)
*G06F 21/55* (2013.01)

(Continued)

(52) U.S. Cl.

CPC .......... *H04L 63/1416* (2013.01); *H04L 41/16* (2013.01)

(58) Field of Classification Search

None

See application file for complete search history.

(56) References Cited

U.S. PATENT DOCUMENTS

| | | | | |
|---|---|---|---|---|
| 11,218,502 | B1 * | 1/2022 | Li | H04L 63/1425 |
| 2017/0329314 | A1 * | 11/2017 | Shang | G05B 19/4185 |
| 2025/0379877 | A1 * | 12/2025 | Chaudhury | H04L 63/1425 |

FOREIGN PATENT DOCUMENTS

| | | | | |
|---|---|---|---|---|
| CN | 113868642 | A * | 12/2021 | G06N 3/044 |
| CN | 114205101 | A * | 3/2022 | G06F 18/2411 |

(Continued)

OTHER PUBLICATIONS

Applications of deep learning algorithms for Supervisory Control and Data Acquisition intrusion detection system,. Balla et al., Elsevier. (Year: 2022).*

(Continued)

*Primary Examiner* — Venkat Perungavoor
(74) *Attorney, Agent, or Firm* — Jason C. Cameron

(57) ABSTRACT

The present invention discloses a method and system for detecting intrusion in industrial control systems. The method comprises generating predetermined parameters for detection, including projection matrices, aggregation matrices, and decision boundaries, receiving real-time sensor measurements from a plurality of sensors, generating a plurality of lag vectors from the received sensor measurements, mapping the lag vectors into a noise-free signal subspace using the predetermined projection matrices, aggregating the mapped lag vectors into an aggregated signal subspace using an aggregation function, wherein the aggregation function is generated using the generated predetermined aggregation matrices, computing a plurality of departure scores using the predetermined decision boundaries, aggregating the plurality of departure scores to perform a smoothing on the aggregated departure scores and generating an alert when the smoothed departure score exceeds a predetermined threshold.

11 Claims, 5 Drawing Sheets

(51) Int. Cl.

| | |
|---|---|
| ***H04L 9/40*** | (2022.01) |
| ***H04L 41/16*** | (2022.01) |
| *G06F 21/56* | (2013.01) |
| *H04L 47/122* | (2022.01) |

(56) References Cited

FOREIGN PATENT DOCUMENTS

| | | | | | |
|---|---|---|---|---|---|
| CN | 116028875 A | * | 4/2023 | | |
| CN | 118413379 A | * | 7/2024 | ............... | H04L 9/40 |

OTHER PUBLICATIONS

A Survey on Machine-Learning Based Security Design for Cyber-Physical Systems. Kim et al. MDPI. (Year: 2021).*

IIoT Malware Detection Using Edge Computing and Deep Learning for Cybersecurity in Smart Factories. Kim et al. (Year: 2022).*

Securing Industrial Control Systems: Components, Cyber Threats, and Machine Learning-Driven Defense Strategies. Nankya et al. MDPI. (Year: 2023).*

* cited by examiner

METHOD AND SYSTEM FOR DETECTING INTRUSIONS IN INDUSTRIAL CONTROL SYSTEMS

EARLIEST PRIORITY DATE

This application claims priority from a Provisional patent application filed in India having patent application No. 202411061459, filed on 13 Aug. 2024 and titled "A PROCESS-LEVEL INTRUSION DETECTION SYSTEM FOR SECURING INDUSTRIAL CONTROL SYSTEMS"

FIELD OF INVENTION

Embodiments of the present invention in general relate to the technical field of cybersecurity solutions in critical infrastructures, and more particularly, to a system and method for detecting intrusions in industrial control systems.

BACKGROUND

Industrial control systems (ICS) are essential to critical infrastructure like power plants, water treatment facilities, and manufacturing sites. These systems rely on interconnected sensors, actuators, and controllers to manage complex processes efficiently and safely. However, as ICS environments become more digitized and connected, they face growing cybersecurity threats that could disrupt operations, damage equipment, or even jeopardize public safety.

Intrusion detection systems (IDS) play a critical role in enhancing ICS security by identifying malicious activity or policy violations within industrial networks. Traditional network-based IDS approaches, though beneficial, often fall short in addressing the unique characteristics of ICS environments. Attacker may adeptly bypass the network security but their ultimate aim to perform the malicious activity gets reflected in the form of abnormal measurements. To counter such threats, process-level IDS may present a possible solution, the process-level IDS focuses on analyzing physical process behaviors and sensor data to detect anomalies that could signal cyber-attacks or malfunctions. A process-level IDS can increase the defense-in-depth by detecting the malicious activity and preventing the system from lasting damage.

However, even the process level IDSs face significant technical challenges. The process-level IDS are of two types, i.e., Univariate and Multivariate. Univariate IDS approaches analyze each process variable (PV) independently but fail to detect critical correlations between PVs, leaving systems vulnerable to sophisticated attacks. Conversely, multivariate IDS methods capture these correlations but are susceptible to evasion attacks and performance degradation due to the inclusion of uncorrelated PVs. Moreover, the dynamic nature of sensor data necessitates efficient real-time processing to distinguish genuine threats from natural fluctuations.

Hence, there is a need for an efficient system and method for detecting intrusions in industrial control systems, to address the aforementioned issues.

SUMMARY

This summary is provided to introduce a selection of concepts, in a simple manner, which is further described in the detailed description of the disclosure. This summary is neither intended to identify key or essential inventive concepts of the subject matter nor to determine the scope of the disclosure.

In accordance with one embodiment of the present invention disclosure, a method for detecting instruction in industrial control systems is disclosed. The method comprises generating predetermined parameters for detection, including projection matrices, aggregation matrices, and decision boundaries, receiving real-time sensor measurements from a plurality of sensors, generating a plurality of lag vectors from the received sensor measurements, mapping the lag vectors into a noise-free signal subspace using the predetermined projection matrices, aggregating the mapped lag vectors into an aggregated signal subspace using an aggregation function, wherein the aggregation function is generated using the generated predetermined aggregation matrices, computing a plurality of departure scores for each of the aggregated lag vectors using the predetermined decision boundaries, aggregating the plurality of departure scores to perform a smoothing on the aggregated departure scores and generating an alert when the smoothed departure score exceeds a predetermined threshold.

In an embodiment, the generating of predetermined parameters further comprises receiving a plurality of historical time series sensor measurements, generating noise-free signal subspaces for the received historical time-series sensor measurements using Singular Spectrum Analysis (SSA), creating projection matrices corresponding to each sensor from the generated noise-free signal subspaces, generating a correlation matrix based on a correlation between the time series sensor measurements and applying a predefined correlation threshold to the correlation matrix to group the sensors into correlated sets, generating an aggregation matrix for each of the correlated set of sensors, generating an aggregation function using the generated aggregation matrix for each correlated set of sensors, mapping the signal subspaces of correlated sensors into an aggregated signal subspace using the generated aggregation function and generating decision boundaries for each aggregated signal subspace, wherein the decision boundaries are configured to separate anomaly sensor measurements from normal sensor measurements.

In one aspect, a system for detecting intrusions in industrial control systems is disclosed. The system comprising one or more hardware processors and a memory coupled to the one or more hardware processors, wherein the memory comprises a plurality of modules executable by the one or more hardware processors, and wherein the plurality of modules comprises model parameter training module configured to generate predetermined parameters including projection matrices, aggregation matrices and decision boundaries, a data processing module configured to receive real-time sensor measurements from a plurality of sensor, generate a plurality of lag vectors from the received sensor measurements, a real-time mapping module configured to map the lag vectors into a noise-free signal subspace using the predetermined projection matrices, aggregate the mapped lag vectors into an aggregated signal subspace using the aggregation function, wherein the aggregation function is generated using the predetermined aggregation matrices, a scoring module configured to compute a plurality of departure score for each of the aggregated feature vectors using the predetermined decision boundary, aggregate the plurality of departure scores to perform a smoothing on the aggregated departure scores, an alert generation module configured to generate an alert when the smoothed departure score exceeds a predetermined threshold.

In an embodiment, the model parameter training module is further comprises projection module configured to receive a plurality of historical time series sensor measurements, generate noise-free signal subspaces for the received historical time-series sensor measurements, using Singular Spectrum Analysis (SSA), create projection matrices corresponding to each sensor from the generated noise-free signal subspaces, correlation module configured to generate a correlation matrix based on a correlation between the time series sensor measurements and apply a predefined correlation threshold to the correlation matrix to group the sensors into correlated sets aggregation module configured to generate an aggregation matrix for each of the correlated set of sensors, generate an aggregation function using the generated aggregation matrix for each correlated set of sensors, map the signal subspaces of correlated sensors into an aggregated signal subspace using the generated aggregation function, boundary generation module configured to generate decision boundaries for each aggregated signal subspace, wherein the decision boundaries configured to separate anomaly sensor measurements from normal sensor measurements.

In yet another embodiment, the correlation coefficient is a Pearson correlation coefficient.

In yet another embodiment, the aggregation matrix is generated using an autoencoder.

In yet another embodiment, the departure scores are aggregated based on a norm function.

In yet another embodiment, performing smoothing on the aggregated departure scores comprises applying a smoothing function to the departure score including a smoothing window size, a smoothing factor, and a threshold for detecting persistent anomalies.

In another aspect, a non-transitory computer-readable medium storing instructions that, when executed by one or more processors, cause the one or more processors to execute operations of generating predetermined parameters for detection, including projection matrices, aggregation matrices, and decision boundaries, receiving real-time sensor measurements from a plurality of sensors, generating a plurality of lag vectors from the received sensor measurements, mapping the lag vectors into a noise-free signal subspace using the predetermined projection matrices, aggregating the mapped lag vectors into an aggregated signal subspace using an aggregation function, wherein the aggregation function is generated using the generated predetermined aggregation matrices, computing a plurality of departure scores for each of the aggregated lag vectors using the predetermined decision boundaries and aggregating the plurality of departure scores to perform a smoothing on the aggregated departure scores and generating an alert when the smoothed departure score exceeds a predetermined threshold.

To further clarify the advantages and features of the present invention, a more particular description of the invention will follow by reference to specific embodiments thereof, which are illustrated in the appended figures. It is to be appreciated that these figures depict only typical embodiments of the invention and are therefore not to be considered limiting in scope. The invention will be described and explained with additional specificity and detail with the appended figures.

BRIEF DESCRIPTION OF THE DRAWINGS

The disclosure will be described and explained with additional specificity and detail with the accompanying figures in which.

Figure 1:
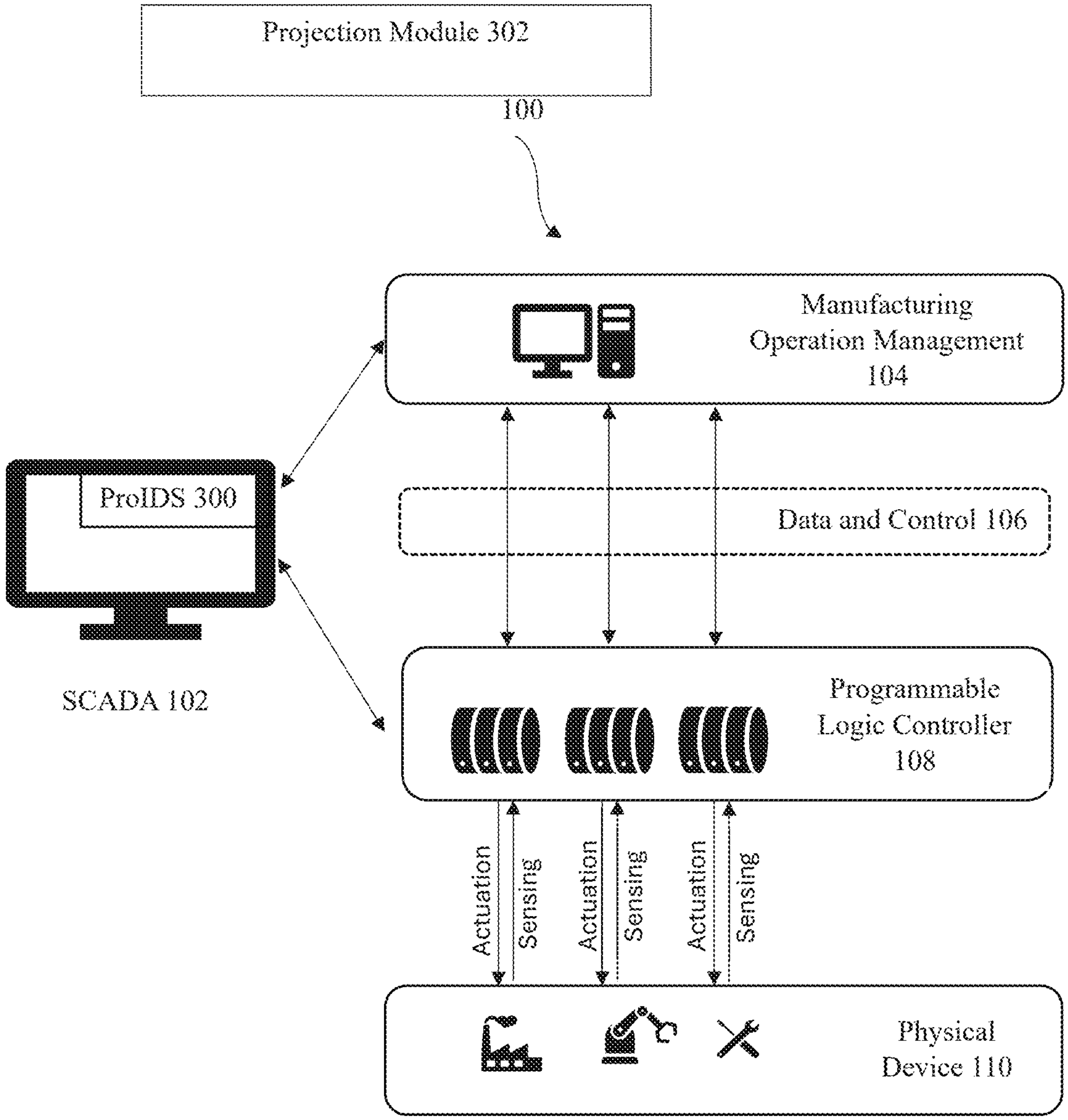
FIG. 1 illustrates a block diagram of an exemplary operational architecture of a system for detecting intrusions in industrial control systems, in accordance with an embodiment of the present invention.

Further, those skilled in the art will appreciate that elements in the figures are illustrated for simplicity and may not have necessarily been drawn to scale. Furthermore, in terms of the construction of the device, one or more components of the device may have been represented in the figures by conventional symbols, and the figures may show only those specific details that are pertinent to understanding the embodiments of the present disclosure so as not to obscure the figures with details that will be readily apparent to those skilled in the art having the benefit of the description herein.

DETAILED DESCRIPTION OF THE PRESENT INVENTION

For the purpose of promoting an understanding of the principles of the disclosure, reference will now be made to the embodiment illustrated in the figures and specific language will be used to describe them. It will nevertheless be understood that no limitation of the scope of the disclosure is thereby intended. Such alterations and further modifications in the illustrated system, and such further applications of the principles of the disclosure as would normally occur to those skilled in the art are to be construed as being within the scope of the present disclosure.

In the present document, the word "exemplary" is used herein to mean "serving as an example, instance, or illustration." Any embodiment or implementation of the present subject matter described herein as "exemplary" is not necessarily to be construed as preferred or advantageous over other embodiments.

The terms "comprise", "comprising", or any other variations thereof, are intended to cover a non-exclusive inclusion, such that a process or method that comprises a list of steps does not include only those steps but may include other steps not expressly listed or inherent to such a process or method. Similarly, one or more devices or sub-systems or elements or structures or components preceded by "comprises . . . a" does not, without more constraints, preclude the existence of other devices, sub-systems, elements, structures, components, additional devices, additional sub-systems, additional elements, additional structures or additional components. Appearances of the phrase "in an embodiment", "in another embodiment" and similar language throughout this specification may, but not necessarily do, all refer to the same embodiment.

Unless otherwise defined, all technical and scientific terms used herein have the same meaning as commonly understood by those skilled in the art to which this disclosure belongs. The system, methods, and examples provided herein are only illustrative and not intended to be limiting.

In the following specification and the claims, reference will be made to a number of terms, which shall be defined to have the following meanings. The singular forms "a", "an", and "the" include plural references unless the context clearly dictates otherwise.

A computer system (standalone, client or server computer system) configured by an application may constitute a "module" (or "subsystem") that is configured and operated to perform certain operations. In one embodiment, the "module" or "subsystem" may be implemented mechanically or electronically, so a module includes dedicated circuitry or logic that is permanently configured (within a special-purpose processor) to perform certain operations. In another embodiment, a "module" or "subsystem" may also comprise programmable logic or circuitry (as encompassed within a general-purpose processor or other programmable processor) that is temporarily configured by software to perform certain operations.

Accordingly, the term "module" or "subsystem" should be understood to encompass a tangible entity, be that an entity that is physically constructed permanently configured (hardwired) or temporarily configured (programmed) to operate in a certain manner and/or to perform certain operations described herein.

Embodiments of the present invention relate to a method and system for detecting intrusion in industrial control systems.

Referring now to the drawings, and more particularly to FIG. 1 through FIG. 5, where similar reference characters denote corresponding features consistently throughout the figures, there are shown preferred embodiments, and these embodiments are described in the context of the following exemplary system and/or method.

The present invention provides a novel system and method for intrusion detection in industrial control systems (ICS), essential for the operation of critical infrastructures like power plants, water treatment facilities, and manufacturing sites. The invention monitors physical process behaviors and sensor data, identifying anomalies indicative of potential cyber-attacks or system malfunctions. Designed to address the distinct challenges in ICS environments, the system and method capture the complex relationships between different sensor measurements, maintaining resilience against evasion attempts. Furthermore, the invention accommodates natural sensor data fluctuations, enabling precise threat identification. The system and method also process high-frequency data efficiently, ensuring real-time detection of issues.

FIG. 1 illustrates a block diagram of an exemplary operational architecture of a system for detecting intrusions in industrial control systems, in accordance with an embodiment of the present invention.

According to an embodiment of the present disclosure, the operational architecture of system 100 comprises a Supervisory Control and Data Acquisition (SCADA) system 102, which serves as the central system for the entire operation. The SCADA system 102 is equipped with ProIDS system 300, an intrusion detection system for industrial control systems. This integration of ProIDS 300 within the SCADA framework enables real-time monitoring and anomaly detection to safeguard against potential threats. In addition, the placement of the ProIDS is beneficial due to the presence of the SCADA framework within the area operation zone for prompt response to the streaming measurements.

The integration of ProIDS system 300 within the SCADA system 102 enhances the system's security posture. By analyzing the data streams from various sensors and control signals, ProIDS system 300 can detect anomalies that may indicate potential intrusions or system malfunctions. This capability is useful in infrastructure environments where any compromise could lead to consequences. The placement of ProIDS system 300 at the SCADA level enables oversight of the entire system, allowing it to correlate data from multiple sources and identify complex attack patterns that might not be apparent when examining individual components in isolation.

The system 100 is a multi-layered industrial control systems wherein the manufacturing operation management module 104 oversees the broader operational strategies and decision-making processes. This module interfaces with the rest of the system through the data and control module 106, which acts as a central hub for information exchange and control signal distribution. The data and control module 106 facilitates communication between the upper management level and the operational components, enabling data flow and command execution throughout the system.

Furthermore, the system consists of a programmable logic controller (PLC) 108 which translates high-level commands into actionable control signals for the physical devices. The PLC 108 is depicted as a series of interconnected units, highlighting its capability to manage multiple processes or devices simultaneously. As used herein, the term "programmable logic controller" or "PLC" refers to a system used for automation of industrial processes, such as control of machinery on factory assembly lines. A PLC is designed for multiple inputs and output arrangements, extended temperature ranges, immunity to electrical noise, and resistance to vibration and impact. It executes a program to provide output based on input conditions and internal logic. In the context of the present invention, the PLC 108 interfaces between the higher-level control systems and the physical devices or machinery being controlled, translating commands into actionable control signals and relaying sensor data back to the supervisory systems. The physical devices 110 are industrial equipment or machinery that carries out the processes upon receiving a specific command from the PLC 108. The communication between the PLC 108 and the physical device 110 are performed by actuators and sensors respectively, that perform the "Actuation" and "Sensing,". This communication allows the programmable logic controller 108 to both control the physical device 110 as well as receive feedback from it.

The overall architecture of system 100 exemplifies an approach to industrial control and monitoring, where operational efficiency is balanced with security measures. By integrating intrusion detection capabilities into the supervisory control layer, the system provides a solution for managing and protecting infrastructure against cyber threats while maintaining operational performance.

Figure 2:
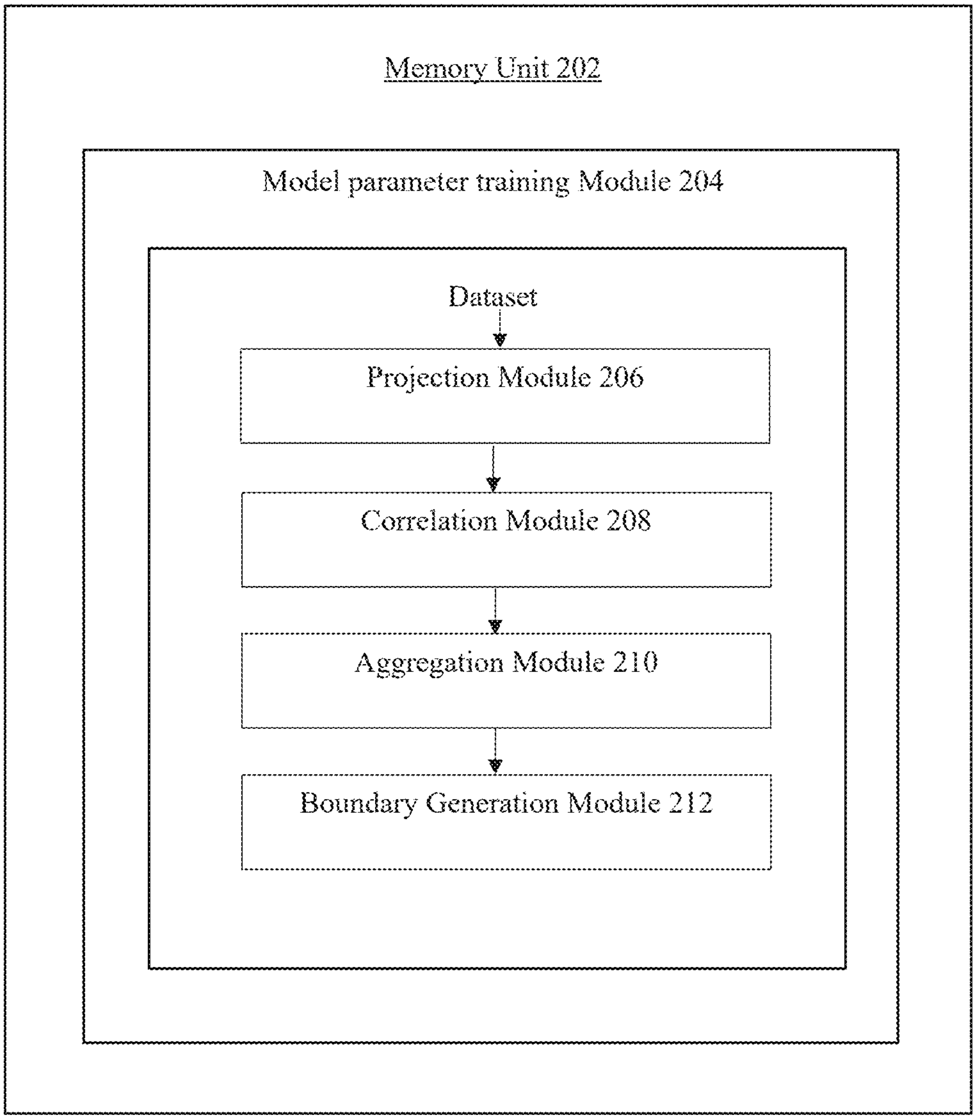
FIG. 2 illustrates an exemplary block diagram representation of the model parameter training module, in accordance with an embodiment of the present invention.

FIG. 2 illustrates an exemplary block diagram representation of the model parameter training module, in accordance with an embodiment of the present invention.

According to an embodiment of the present invention, the model parameter training module (204) operates in offline mode, where model parameters are generated for intrusion detection in an industrial detection system.

The model parameter training module (204) resides in a memory unit (202) and is part of the ProIDS system (300). The model parameter training module (204) comprises of a Projection module (206), a Correlation Module (208), an aggregation module ((210) and a boundary generation module (212) and is configured to generate predetermined parameters, including projection matrices P (i), aggregation matrices, and decision boundaries.

The model parameter training module (204) comprises a projection module (206), which receives a plurality of historical time-series sensor measurements. These historical sensor measurements are then processed by the projection module (206) to generate noise-free signal subspaces using Singular Spectrum Analysis (SSA). The SSA process involves embedding the time series data into a trajectory matrix $M^{(i)}$ with dimensions L×K, where L is the lag parameter and K=T−L+1. Each column vector of $M^{(i)}$ is a lagged vector $M_{(i)}$ for 1≤i≤K, given as $M^{(i)}=[m_i, m_{i+1}, \ldots, m_{i+L-1}]^T$. The trajectory matrix $M^{(i)}$, where $$X_t^{(i)}$$

represents the measurement at time t for sensor i, is defined as:

$$M^{(i)} = \begin{bmatrix} x_1^{(i)} & x_1^{(i)} & \ldots & x_1^{(i)} \\ \vdots & \vdots & \ldots & \vdots \\ x_L^{(i)} & x_L^{(i)} & \ldots & x_L^{(i)} \end{bmatrix}_{L\times K}$$

Singular Value Decomposition (SVD) is then performed on the trajectory matrix $M^{(i)}$ to obtain eigenvalues $\lambda_1, \lambda_2, \ldots, \lambda_L$ and their respective eigenvectors $U_1, U_2, \ldots, U_L$, which are used to create the projection matrix $P^{(i)}$. The projection matrix $P^{(i)}=U^T$, where $U=[U_1, U_2, \ldots, U_r]$ is the matrix of r leading eigenvectors, preserves the Euclidean distance projected by $P^{(i)}=U^T$ compared to that projected by $P^{(i)}=UU^T$. Specifically, for a lag vector m, the following holds:

$$\|U\, U^T m\| = \|U^T m\|$$

The projection module (206) creates projection matrices corresponding to each sensor from the generated noise-free signal subspaces $S^{(i)}$. The signal subspaces are obtained as follows:

$$S^{(i)} = P^{(i)} M^{(i)}$$

The model parameter training module (204) further comprises a correlation module (208). The correlation module (208) is operably coupled to the projection module (206) and is configured to receive the noise-free signal subspaces. The correlation module (208) generates a correlation matrix based on correlation between the time series sensor measurements. This correlation matrix between the time series of two sensors (i) and (j) is calculated using Person correlation and mathematically represented as:

$$R[i, j] = \frac{\sum_{t=1}^{n} (X_t^{(i)} - E[X^{(i)}])(X_t^{(j)} - E[X^{(j)}])}{\sqrt{\sum_{t=1}^{n} (X_t^{(i)} - E[X^{(i)}])^2}\sqrt{\sum_{t=1}^{n} (X_t^{(j)} - E[X^{(j)}])^2}}$$

Where $E[X^{(i)}]$ and $E[X^{(j)}]$ are the expectations (means) of the time series for sensors i and j, respectively, and t represents a specific time point or measurement index within the time series data.

The correlation module (208) then applies a predefined correlation threshold α to the correlation matrix to group the sensors into correlated sets $C^{(i)}$ for every i and j. The correlated set $C^{(i)}$ is defined as:

$$C^{(i)} = \{i\} \cup \{j\colon R[i, j] > \alpha\}$$

In the collection of correlated sets C, there may exist redundant or duplicate sets. Such redundancies can increase computational complexity and vulnerability. To address this, the correlation module (208) identifies and removes these redundant sets from C. A set $C^{(i)}$ is considered redundant if there exists a superset $C^{(j)}$ in C such that $C^{(i)} \subseteq C^{(j)}$ and i≠j. The indices of all such redundant sets are collected and removed from the set C. The redundant set indices are defined as:

$$\{i \mid C^{(i)}, C^{(j)} \in C, i \neq j, C^{(i)} \subseteq C^{(j)}\}$$

After identifying these indices, the correlation module (208) removes the corresponding sets from C to obtain a refined collection of unique and non-redundant sets.

As the correlation matrix R does not hold the transitive property, there may be shared elements across mutually correlated sets. These overlaps can create issues as they violate the segregation property and may support the evasion attack vulnerability. To address this, the correlation module (208) further refines the collection of correlated sets C by using segregation. This process involves combining sets that share common elements and removing the smaller set. However, if the resulting combined set exceeds a predefined maxSize parameter, the sets are not merged; instead, the shared elements are removed from the larger set.

The model parameter training module (204) further comprises an aggregation module (210). The aggregation module (210) is operably coupled to the correlation module (208). The correlated groups of sensors are then passed to the aggregation module (210), which generates an aggregation matrix for each of the correlated sets of sensors. For each correlated sensor group C (c), the preparation of the input vector involves initializing a 2D matrix. The values for this matrix are set for 0≤i<n and 0≤k<(T−L+1) as follows:

$$X[k][i \times r\colon (i+1) \times r] = S(C_i^{(c)})_k$$

Here, $$S(C_i^{(c)})_k$$

represents the k-th point in the signal subspace corresponding to sensor indexed $$C_i^{(c)}$$

wherein i representing the index of a sensor.

The aggregation module (210) generates an aggregation function using the generated aggregation matrix for each correlated set of sensors. An aggregation matrix is generated using an autoencoder. The autoencoder consists of a single hidden layer with n×r neurons at the input and output layers, and r neurons at the hidden layer, where n represents the number of PVs in the correlated set, and r denotes the dimensionality of the signal subspace.

The aggregation matrix (210) then learns a signal subspace aggregation matrix for every correlated set $C^{(c)} \in C$. The aggregation module (210) utilizes an autoencoder to learn about the aggregation matrix, $W^{(c)}$. The autoencoder (AE) model can be defined as f(x) with a single hidden layer of size r. The AE model is trained with the objective of minimizing the reconstruction error. The AE model training utilizes the mean squared error loss function with an Adam optimizer. The number of training epochs is determined as epoch=20×n. After training, the encoder layer matrix is used as the aggregation matrix.

The aggregation matrix then maps the signal subspaces into a lower-dimensional latent space, referred to as the aggregated signal subspace. The aggregation module (210) considers the encoder layer weight matrix W (c) that maps correlated signal subspaces into another r-dimensional latent signal subspace, which is mathematically denoted as:

$$S^{(c)} = X\hat{W}^{(c)}$$

Finally, the aggregated signal subspace $S^{(c)}$ for the sensors in $C^{(c)}$ is generated.

The model parameter training module (204) further comprises a boundary generation module (212). The boundary generation module (212) is operably coupled to the aggregation module (210). The boundary generation module (212) receives the aggregated signal subspaces from the aggregation module (210) and generates decision boundaries for each aggregated signal subspace. The decision boundaries are configured to separate anomaly sensor measurements from normal sensor measurements. The boundary generation module (212) employs an ellipsoidal decision boundary (EDB)-based model to detect deviations from the normal behavior within an Industrial Control System. The EDB for each normal cluster $S^{(c)}$ in the signal subspace is created as follows:

Centroid Calculation:

The centroid $\hat{e}^{(c)}$ is computed by averaging the minimum and maximum values of the aggregated signal subspace $S^{(c)}$:

$$\hat{c}^{(c)} = \frac{\min(S^{(c)}) + \max(S^{(c)})}{2}$$

Distance Function:

The distance function d(x) measures the deviation of a point x from the centroid $\hat{e}^{(c)}$ in the signal subspace:

$$d(x) = \left\langle w^{(c)}, \left(x - \hat{c}^{(c)}\right)^2 \right\rangle$$

Weight Vector:

The weight vector $w^{(c)}$ is determined by minimizing a product expression that ensures the ellipsoidal decision boundary (EDB) encompasses the normal sensor measurements while excluding anomalies:

$$w^{(c)} = \arg\min_{w^{(c)}} \left( \prod_{i=1}^{r} \left(w_i^{(c)}\right)^{-0.5} \right)$$

subject to the constraints:

$$\langle w(c), (x - \hat{c}(c))2 \rangle \leq 1 \ \forall\, x \in X \ w^{(c)} > 0$$

Where Π is a product operator that calculates the product of elements in a vector.

This ensures that the EDB correctly separates anomaly sensor measurements from normal sensor measurements, enhancing the detection accuracy of the ProIDS system (300).

Figure 3:
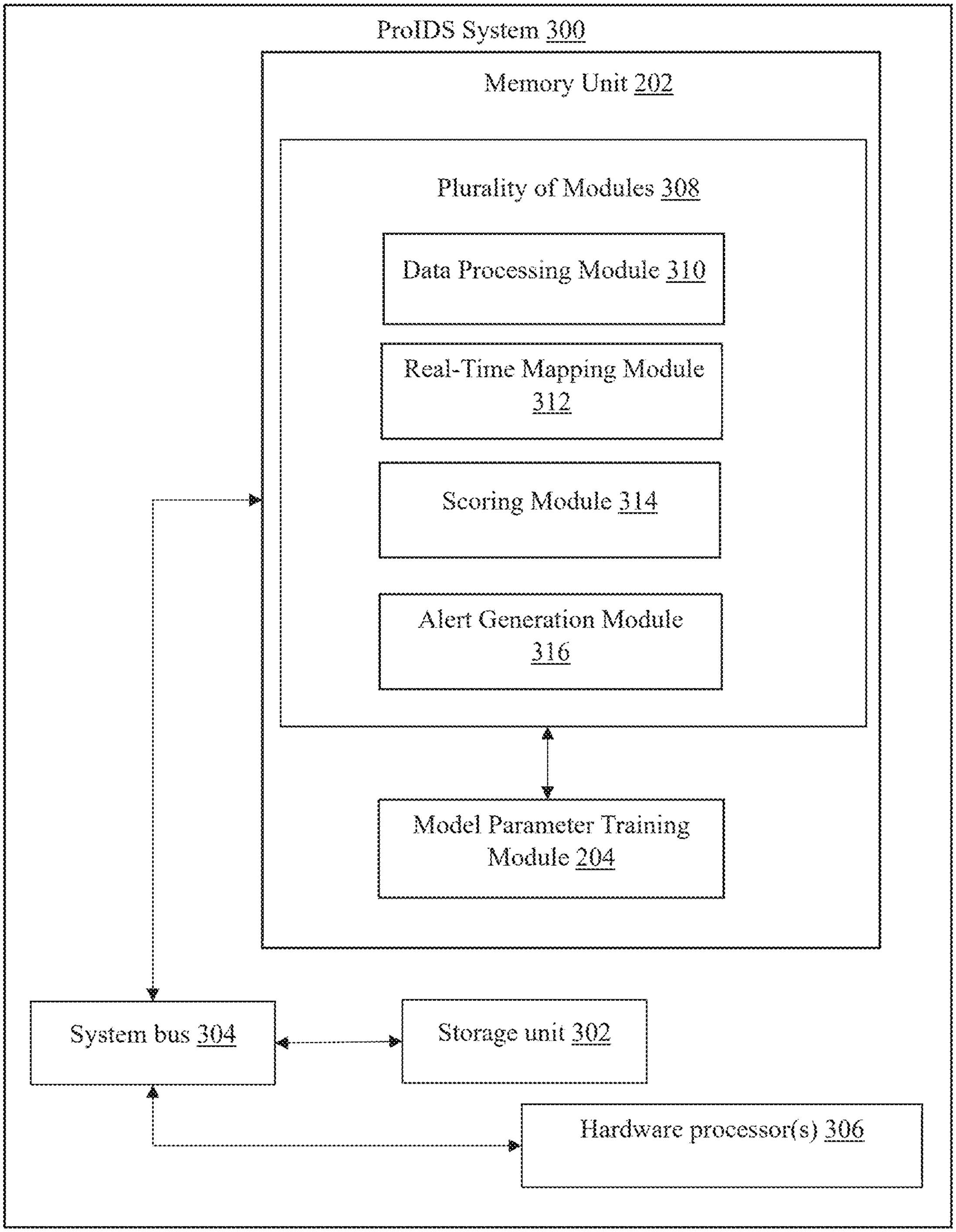
FIG. 3 illustrates an exemplary block diagram representation of the system, in accordance with an embodiment of the present invention.

FIG. 3 illustrates an exemplary block diagram representation of the system, in accordance with an embodiment of the present invention.

In an exemplary embodiment, the ProIDS system 300 comprises one or more hardware processors 306, a memory unit 202, and a storage unit 302. The one or more hardware processors 306, the memory unit 202, and the storage unit 302 are communicatively coupled through a system bus 304 or any similar mechanism. The system 300 is a part of a larger SCADA system 102. The memory unit 202 comprises a plurality of modules 308 and a Model Parameter Training Module 204. The plurality of module 08 along with the Model Parameter Training module 204 processes and analyzes the data from the physical devices to detect anomalies and potential intrusions in real-time.

The memory unit 202 stores sensor measurement for execution and analysis during system operation. The memory unit 202 is designed to support system 300 functionality, enabling efficient data retrieval and storage for capability assessment and countermeasure development. The memory unit 202 can include various types, such as random-access memory, read-only memory, flash memory, solid-state drives, hard disk drives, or other data storage devices. The hardware processors 306 may include microprocessors, microcomputers, microcontrollers, digital signal processors, central processing units, state machines, logic circuits, or any devices that process data or signals as per operational instructions. These processors fetch and execute instructions stored in memory unit 202, enabling system 300 to perform tasks such as data processing and input/output handling.

According to an embodiment of the present invention, the ProIDS system 300 architecture in online mode, which utilizes the model parameters generated in the offline mode. The ProIDS system (300) includes a Plurality of Modules (308). The plurality of modules (308) comprises a data processing module (310), a real-time mapping module (312), a scoring module (314), and an alert generation module (316).

The data processing module (310) is configured to handle incoming real-time data from physical devices (110). Upon receiving the real-time sensor data, a lag vector m is generated by the data processing module (310). For a sensor i, the time series data $$X^{(i)} = \left[X_1^{(i)}, X_2^{(i)}, \ldots, X_t^{(i)}, X_{t+1}^{(i)}, \ldots\right]$$

is used to construct a lag vector m for the current measurement $$X_t^{(i)}$$

as:

$$m = \left[X_{t-L+1}^{(i)}, \ldots, X_{t-1,}^{(i)}, X_t^{(i)}\right]^T$$

Where $$X_t^{(i)}$$

represents the measurement at time t for sensor i.

As new measurements are received, the lag vector m is updated by discarding the oldest measurements and incorporating the latest one, maintaining a window of the most recent L observations. This structured representation is crucial for capturing temporal patterns and dependencies in the sensor data, forming the basis of subsequent analysis and anomaly detection.

The plurality of modules further comprises a real time mapping module (312). The real-time mapping module (312) is operably coupled to the data processing module (310). The real-time mapping module (312) receives the lag vectors m from the data processing module (310) and maps them into noise-free signal subspaces $y^{(i)}$ using the projection matrices $P^{(i)}$ generated by the projection module (206). The lag vector m is projected onto the respective signal subspace using the corresponding projection matrix $P^{(i)}$:

$$y^{(i)} = P^{(i)}m$$

The real-time mapping module (312) further aggregates the mapped signal subspaces into aggregated signal subspaces using the aggregation matrices generated by the aggregation module (210). For each correlated group $C^{(c)}$, the signal subspace points $$y\left(C_i^{(c)}\right)$$

for i ranging from 0 to $\eta(C^{(c)})$ are extended into an extended vector x as follows:

$$x[i \times r:(i+1) \times r] = y\left(C_i^{(c)}\right)$$

wherein, $\eta(C^{(c)})$ represents the number of sensors in the correlated set $C^{(c)}$.

The extended vector x is then projected into the aggregated signal subspace using the aggregation matrix $W^{(c)}$:

$$\hat{x}^{(c)} = W^{(c)T}x$$

The plurality of modules further comprises a scoring module (314). The scoring module (314) is operably coupled to the real-time mapping module (312). The scoring module (314) receives the aggregated signal subspaces $\hat{x}^{(c)}$ from the real-time mapping module (312) and computes departure scores $d_t[c]$ based on these subspaces and the decision boundaries generated by the boundary generation module (212). For $0 \le c < \eta(C)$, at timestamp t, the departure score is stored in a departure score vector $d_t \in R^{\eta(C)}$, wherein $R^{\eta(C(c))}$ denotes the $\eta(C^{(c)})$ dimensional real coordinate space, as follows:

$$d_t[c] = \left\langle w^{(c)}, \left(\hat{x}^{(c)} - \hat{c}^{(c)}\right)^2 \right\rangle$$

The departure scores are aggregated as follows:

$$D_t = \|d_t\|_p^p$$

Where $$\|d_t\|_p^p$$

represents the p-norm of vector $d_t$ raised to the ρ-th power, and $D_t$ represents the aggregated departure score. Here, $D_t$ is the aggregated departure score at timestamp t.

The scoring module (314) further employs a smoothing technique to refine the aggregated departure scores before comparing them to a predetermined threshold. The aggregated departure score is updated as follows:

$$D_t = \frac{\left(\sum_{t=t-k+1}^{t-1} D_t\right) + D_t}{k}$$

Where k represents the smoothing parameter, and $D_t$ is the aggregated departure score at timestamp t.

The plurality of modules further comprises an alert generation module (316). The alert generation module (316) is operably coupled to the scoring module (314). The alert generation module (318) is configured to monitor the smoothed departure scores $D_t$ produced by the scoring module (314) and compares them to a predetermined threshold θ. When the aggregated departure score $D_t$ surpasses this predetermined threshold θ, it indicates a deviation from the expected normal behavior of the system. Such deviations may represent potential intrusions, cyber-attacks, or system malfunctions requiring immediate attention. Upon detecting this condition, the alert generation module (318) triggers an alert to notify the system. The system bus (304) facilitates communication between components, the storage unit (302) stores historical data, and the hardware processor(s) (306) execute computational tasks.

Figure 4:
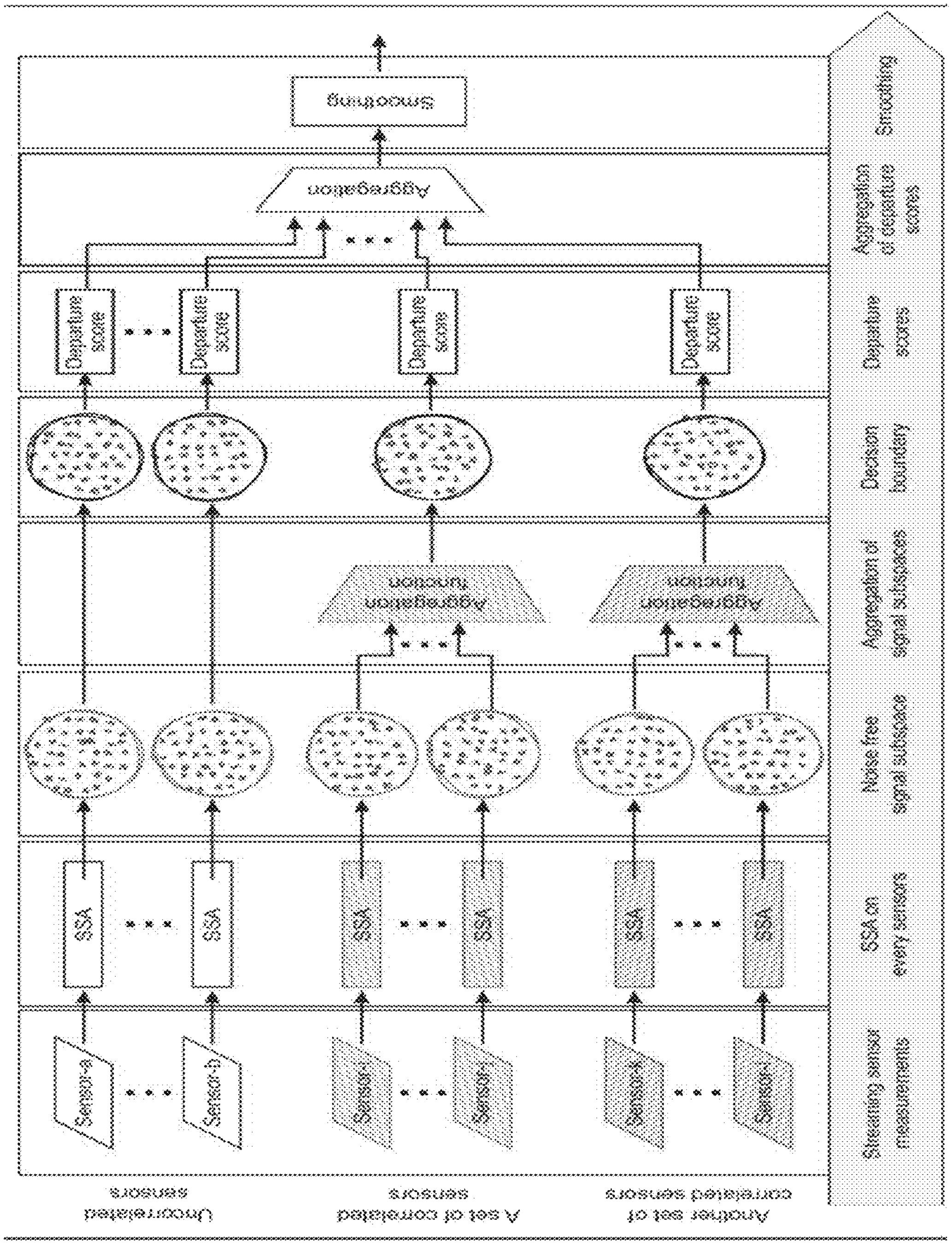
FIG. 4 illustrates a flowchart of online intrusion detection system, in accordance with an embodiment of the present invention.

FIG. 4 illustrates a flowchart of online intrusion detection system, in accordance with an embodiment of the present invention.

In some aspects, the ProIDS system 300 processes streaming sensor measurements through several stages, including Singular Spectrum Analysis (SSA), aggregation, decision boundary generation, and smoothing. The system allows for parallel processing of uncorrelated sensors and different sets of correlated sensors, which may enhance the detection of anomalies while maintaining system security.

In some aspects, sensor measurements are received from a plurality of sensors. These measurements may be mapped onto a noise-free signal subspace using SSA. The noise-free signal subspace may indicate a data matrix capturing primary signal characteristics of the received sensor measurements, devoid of noise. This noise reduction process can enhance the accuracy of subsequent analysis stages by focusing on the primary signal characteristics and eliminating noise-induced fluctuations.

The process may also involve identifying correlated sets of sensors from the plurality of sensors. This identification process may involve analyzing the sensor measurements to determine correlations between different sensors. Sensors that exhibit strong correlations may be grouped together into correlated sets. This grouping allows the system to capture the inherent relationships among various sensor measurements, which can be useful for detecting complex or coordinated attacks that affect multiple sensors simultaneously.

After mapping the sensor measurements onto the noise-free signal subspace, the mapped signal subspaces for each set of correlated sensors may be segregated. This segregation process may involve separating the mapped signal subspaces into distinct units based on the identified correlated sets. Each unit contains the mapped signal subspaces for a specific set of correlated sensors. This segregation allows for separate processing of each set of correlated sensors, which may enhance the system's ability to detect anomalies that affect specific sensor groups.

The ProIDS system 300 further aggregates signal subspaces for correlated sensor sets. This aggregation process may involve combining the segregated signal subspaces for each set of correlated sensors into a single aggregated signal subspace. This aggregation can enhance the system's ability to detect anomalies that affect multiple correlated sensors simultaneously.

Following the aggregation stage, the sensor measurements may pass through a decision boundary stage, where departure scores are computed to detect anomalies. These departure scores may quantify the deviation of the current sensor measurements from the expected normal behavior, as defined by the decision boundaries. The decision boundaries may be generated based on the mapped sensor measurements and represent the expected normal behavior of the sensor measurements.

In some aspects, the univariate IDS may rely on multiple thresholds values, setting a threshold for each departure score. In such cases, a separate threshold is needed for each departure score, which can complicate tuning and potentially compromise IDS performance. To address these challenges, the system transitions into a single-threshold process by aggregating the departure scores. The system aggregates the departure scores using a norm-based method that gives more weight to higher values, even when they are fewer in count. This step is crucial during attacks when only a few sensors generate abnormal measurements, resulting in higher values, while the majority of sensors remain in a normal state.

In some aspects, smoothing may be performed on the computed departure scores prior to comparison with the predetermined threshold. This smoothing operation can help reduce the impact of transient fluctuations in sensor measurements, enhancing the robustness of the intrusion detection process. For performing the smoothing, the ProIDS system 300 applies a smoothing parameter to the aggregated scores.

In some aspects, an alert may be generated when the departure score exceeds a predetermined threshold. This threshold may be set based on historical sensor measurements or other criteria, and it serves as a trigger for potential intrusion detection. When the departure score for any sensor or group of correlated sensors exceeds this threshold, an alert may be generated. This alert can notify operators or other systems of potential intrusions or anomalies, enabling timely response and mitigation actions.

Figure 5:
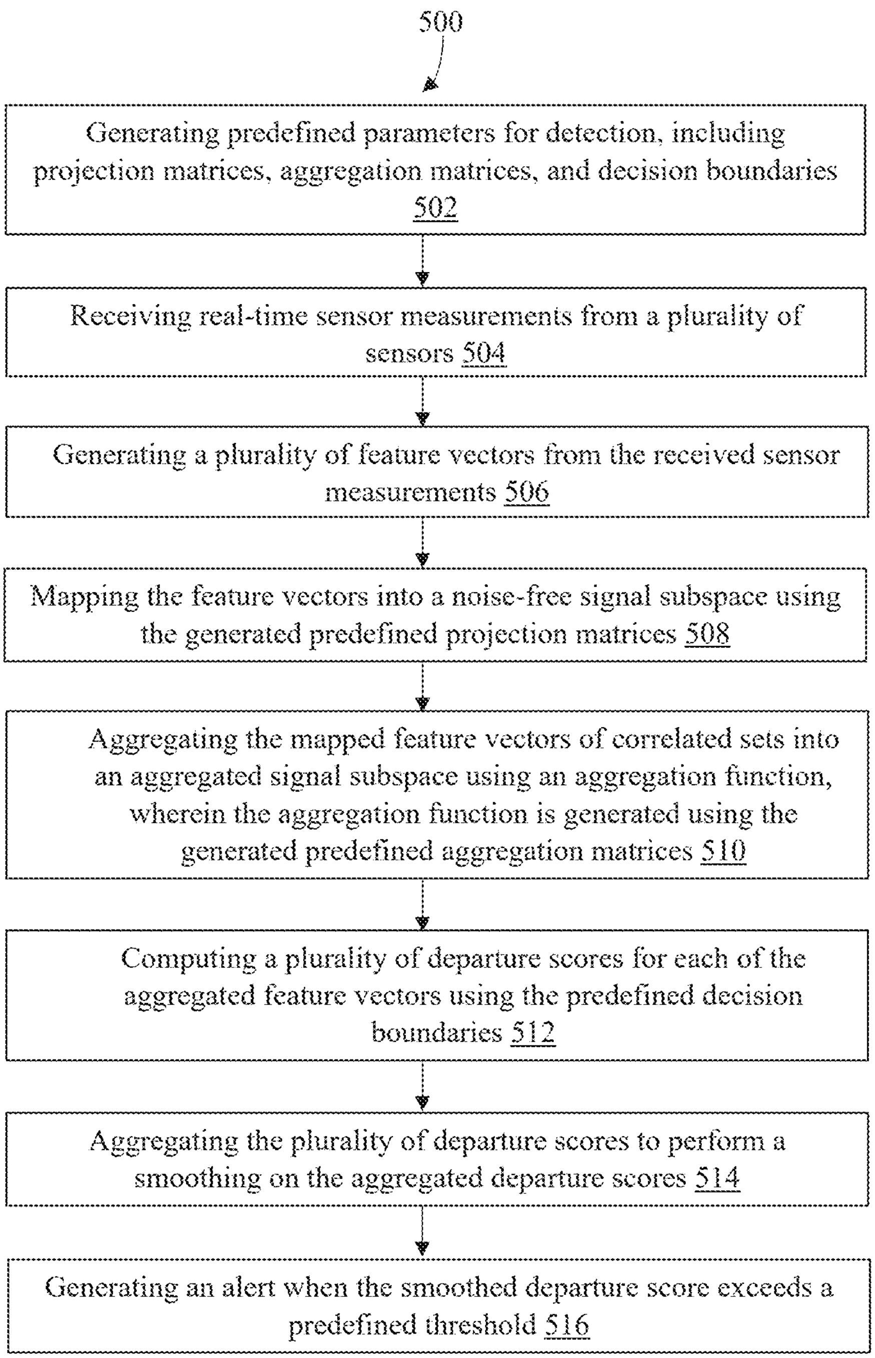
FIG. 5 illustrates a flow chart of a method for detecting intrusion in industrial control systems, in accordance with an embodiment of the present invention.

FIG. 5 illustrates a flow chart of a method for detecting intrusion in industrial control systems, in accordance with an embodiment of the present invention.

At step 502, the method generates using a model parameter training module predetermined parameters for detection, including projection matrices, aggregation matrices, and decision boundaries.

At step 504, the method receives real-time sensor measurements from a plurality of sensors.

At step 506, the method generates a plurality of feature vectors from the received sensor measurements.

At step 508, the method maps the feature vectors into a noise-free signal subspace using the predetermined projection matrices.

At step 510, the method aggregates the mapped feature vectors of a correlated set into an aggregated signal subspace using an aggregation function, wherein the aggregation function is generated using the generated predetermined aggregation matrices.

At step 512, the method computes a plurality of departure scores for each of the aggregated feature vectors using the predetermined decision boundaries.

At step 514, the method aggregates the plurality of departure scores to perform a smoothing on the aggregated departure scores.

At 516, the method generates an alert when the smoothed departure score exceeds a predetermined threshold.

In another embodiment, generating of predetermined parameters further comprises, the method receiving using a projection module a plurality of historical time series sensor measurements, generating noise-free signal subspaces for the received historical time-series sensor measurements using Singular Spectrum Analysis (SSA), creating projection matrices corresponding to each sensor from the generated noise-free signal subspaces, generating a correlation matrix based on a correlation between the time series sensor measurements and applying a predefined correlation threshold to the correlation matrix to group the sensors into correlated sets, generating an aggregation matrix for each of the correlated set of sensors, generating an aggregation function using the generated aggregation matrix for each correlated set of sensors, mapping the signal subspaces of correlated sensors into an aggregated signal subspace using the generated aggregation function and generating decision boundaries for each aggregated signal subspace, wherein the decision boundaries are configured to separate anomaly sensor measurements from normal sensor measurements.

Numerous advantages of the present disclosure may be apparent from the discussion above. The invention offers a robust and efficient solution for real-time monitoring and anomaly detection in complex industrial environments, providing significant practical benefits for operational stability and safety. By enhancing the accuracy of anomaly detection through structured data analysis, this system reduces the likelihood of both false positives and missed detections, which are costly in industrial operations. With its capability to process sensor data from multiple sources and identify abnormal patterns before they escalate, the invention helps prevent potential equipment failures and downtime. This proactive monitoring reduces maintenance costs and improves equipment lifespan, providing a tangible return on investment for industries that rely on continuous and reliable operations.

Additionally, the invention's design facilitates seamless integration with existing industrial systems, making it versatile and adaptable to different operational needs. Its ability to filter out noise and focus on meaningful data insights allows operators to make informed decisions swiftly, thereby improving response times to potential threats or issues. The overall impact of this technology extends beyond technical efficiency, offering practical improvements in operational resilience and safety. By ensuring consistent system performance with minimal manual intervention, this invention optimizes resource allocation and enhances productivity, making it an invaluable asset for industries focused on reliability and cost-effectiveness.

While specific language has been used to describe the invention, any limitations arising on account of the same are not intended. As would be apparent to a person skilled in the art, various working modifications may be made to the method in order to implement the inventive concept as taught herein.

The figures and the foregoing description give examples of embodiments. Those skilled in the art will appreciate that one or more of the described elements may well be combined into a single functional element. Alternatively, certain elements may be split into multiple functional elements. Elements from one embodiment may be added to another embodiment. For example, order of processes described herein may be changed and are not limited to the manner described herein. Moreover, the actions of any flow diagram need not be implemented in the order shown; nor do all of the acts need to be necessarily performed. Also, those acts that are not dependent on other acts may be performed in parallel with the other acts. The scope of embodiments is by no means limited by these specific examples.

We claim:

1. A method for detecting intrusions in industrial control systems, comprising:

generating, by a model parameter training module, predetermined parameters for detection, including projection matrices, aggregation matrices, and decision boundaries;

receiving, by a data processing module, real-time sensor measurements from a plurality of sensors;

generating, by the data processing module, a plurality of lag vectors from the received sensor measurements;

mapping, by a real-time mapping module, the lag vectors into a noise-free signal subspace using the predetermined projection matrices;

aggregating, by the real-time mapping module, the mapped lag vectors into an aggregated signal subspace using an aggregation function, wherein the aggregation function is generated using the generated predetermined aggregation matrices;

computing, by a scoring module, a plurality of departure scores for each of the aggregated lag vectors using the predetermined decision boundaries;

aggregating, by the scoring module, the plurality of departure scores to perform a smoothing on the aggregated departure scores; and generating, by an alert generation module, an alert when the smoothed departure score exceeds a predetermined threshold.

2. The method as claimed in claim 1, wherein the generating of predetermined parameters further comprises:

receiving, by a projection module, a plurality of historical time series sensor measurements;

generating, by the projection module, noise-free signal subspaces for the received historical time-series sensor measurements using Singular Spectrum Analysis (SSA);

creating, by the projection module, projection matrices corresponding to each sensor from the generated noise-free signal subspaces;

generating, by a correlation module, a correlation matrix based on a correlation between the time series sensor measurements;

applying, by the correlation module, a predefined correlation threshold to the correlation matrix to group the sensors into correlated sets;

generating, by an aggregation module, an aggregation matrix for each of the correlated set of sensors;

generating, by the aggregation module, an aggregation function using the generated aggregation matrix for each correlated set of sensors;

mapping, by the aggregation module, the signal subspaces of correlated sensors into an aggregated signal subspace using the generated aggregation function; and generating, by a boundary generation module, decision boundaries for each aggregated signal subspace, wherein the decision boundaries are configured to separate anomaly sensor measurement from normal sensor measurements.

3. The method as claimed in claim 2, wherein the aggregation matrix is generated using an autoencoder.

4. The method as claimed in claim 1, wherein the departure scores are aggregated based on a norm function.

5. The method as claimed in claim 1, wherein performing smoothing on the aggregated departure scores comprises applying a smoothing function to the departure score including a smoothing window size, a smoothing factor, and a threshold for detecting persistent anomalies.

6. A system for detecting intrusions in industrial control systems, comprising:

one or more hardware processors; and a memory coupled to the one or more hardware processors, wherein the memory comprises a plurality of modules executable by the one or more hardware processors, and wherein the plurality of modules comprises:

model parameter training module configured to generate predetermined parameters including projection matrices, aggregation matrices, and decision boundaries;

a data processing module configured to:

receive real-time sensor measurements from a plurality of sensors;

generate a plurality of lag vectors from the received sensor measurements;

a real-time mapping module configured to:

map the lag vectors into a noise-free signal subspace using the predetermined projection matrices;

aggregate the mapped lag vectors into an aggregated signal subspace using the aggregation function, wherein the aggregation function is generated using the predefined predetermined aggregation matrices;

a scoring module configured to:

compute a plurality of departure scores for each of the aggregated lag vectors using the predetermined decision boundary;

aggregate the plurality of departure scores to perform a smoothing on the aggregated departure scores;

an alert generation module configured to generate an alert when the smoothed departure score exceeds a predetermined threshold.

7. The system as claimed in claim 6, wherein the model parameter training module further comprises:

projection module configured to:

receive a plurality of historical time series sensor measurements;

generate noise-free signal subspaces for the received historical time-series sensor measurements, using Singular Spectrum Analysis (SSA);

create projection matrices corresponding to each sensor from the generated noise-free signal subspaces;

correlation module configured to:

generate a correlation matrix based on a correlation between the time series sensor measurements; and apply a predefined correlation threshold to the correlation matrix to group the sensors into correlated sets;

aggregation module configured to:

generate an aggregation matrix for each of the correlated sets of sensors;

generate an aggregation function using the generated aggregation matrix for each correlated set of sensors;

map the signal subspaces of correlated sensors into an aggregated signal subspace using the generated aggregation function;

boundary generation module configured to generate decision boundaries for each aggregated signal subspace, wherein the decision boundaries configured to separate anomaly sensor measurement from normal sensor measurements.

8. The system as claimed in claim 7, wherein the aggregation matrix is generated using an autoencoder.

9. The system as claimed in claim 6, wherein the departure scores are aggregated based on a norm function.

10. The system as claimed in claim 6, wherein performing smoothing on the aggregated departure scores comprises applying a smoothing function to the departure score including a smoothing window size, a smoothing factor, and a threshold for detecting persistent anomalies.

11. A non-transitory computer-readable medium storing instructions that, when executed by one or more processors, cause the one or more processors to execute operations of:

generating predetermined parameters for detection, including projection matrices, aggregation matrices, and decision boundaries;

receiving real-time sensor measurements from a plurality of sensors;

generating a plurality of lag vectors from the received sensor measurements;

mapping the lag vectors into a noise-free signal subspace using the predetermined projection matrices;

aggregating the mapped lag vectors into an aggregated signal subspace using an aggregation function, wherein the aggregation function is generated using the generated predetermined aggregation matrices;

computing a plurality of departure scores for each of the aggregated feature vectors using the predetermined decision boundaries; and aggregating the plurality of departure scores to perform a smoothing on the aggregated departure scores; and generating an alert when the smoothed departure score exceeds a predetermined threshold.

* * * * *